No. 833,309. PATENTED OCT. 16, 1906.
J. N. DAVISON.
HAY RAKE AND LOADER.
APPLICATION FILED MAY 13, 1905.

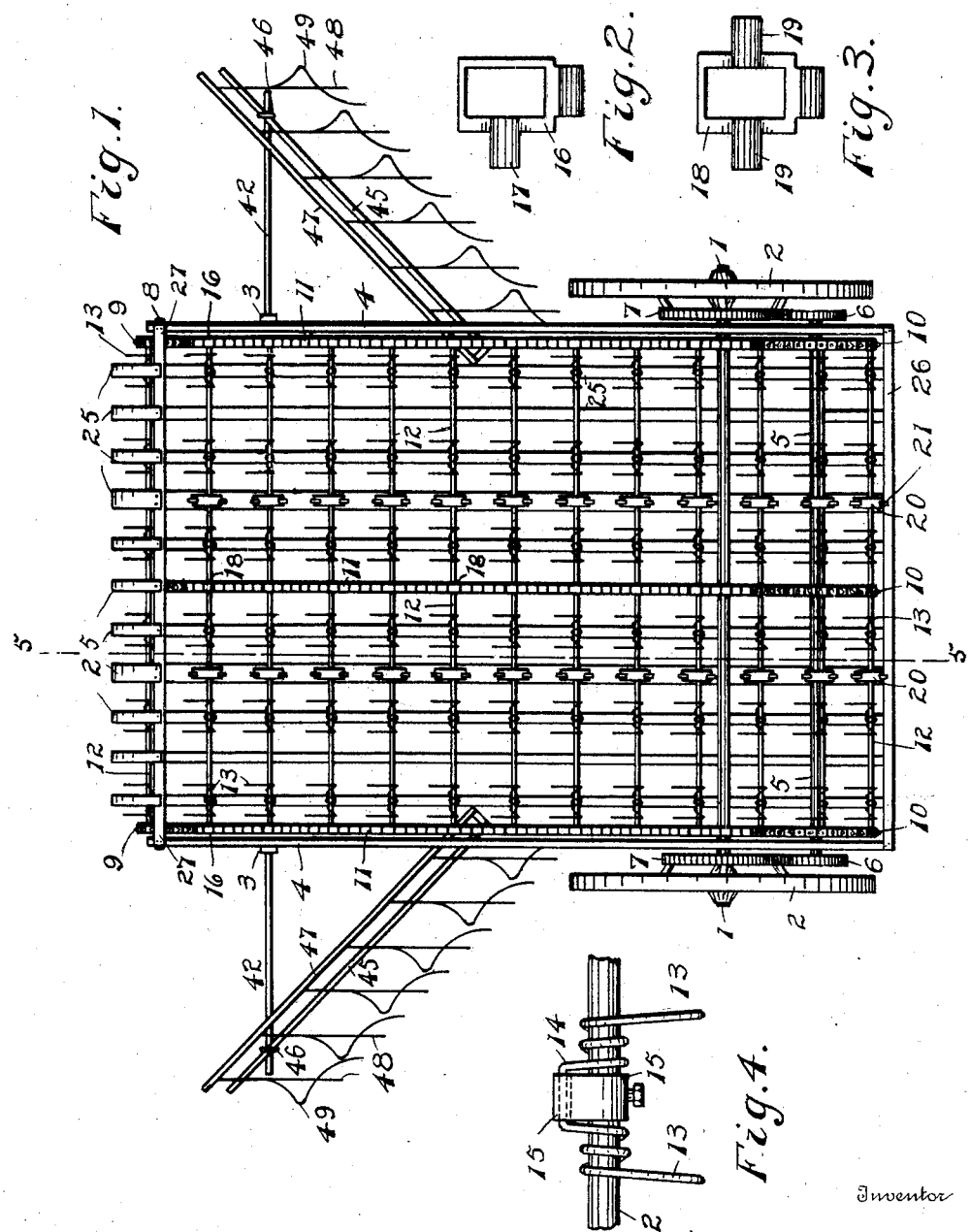

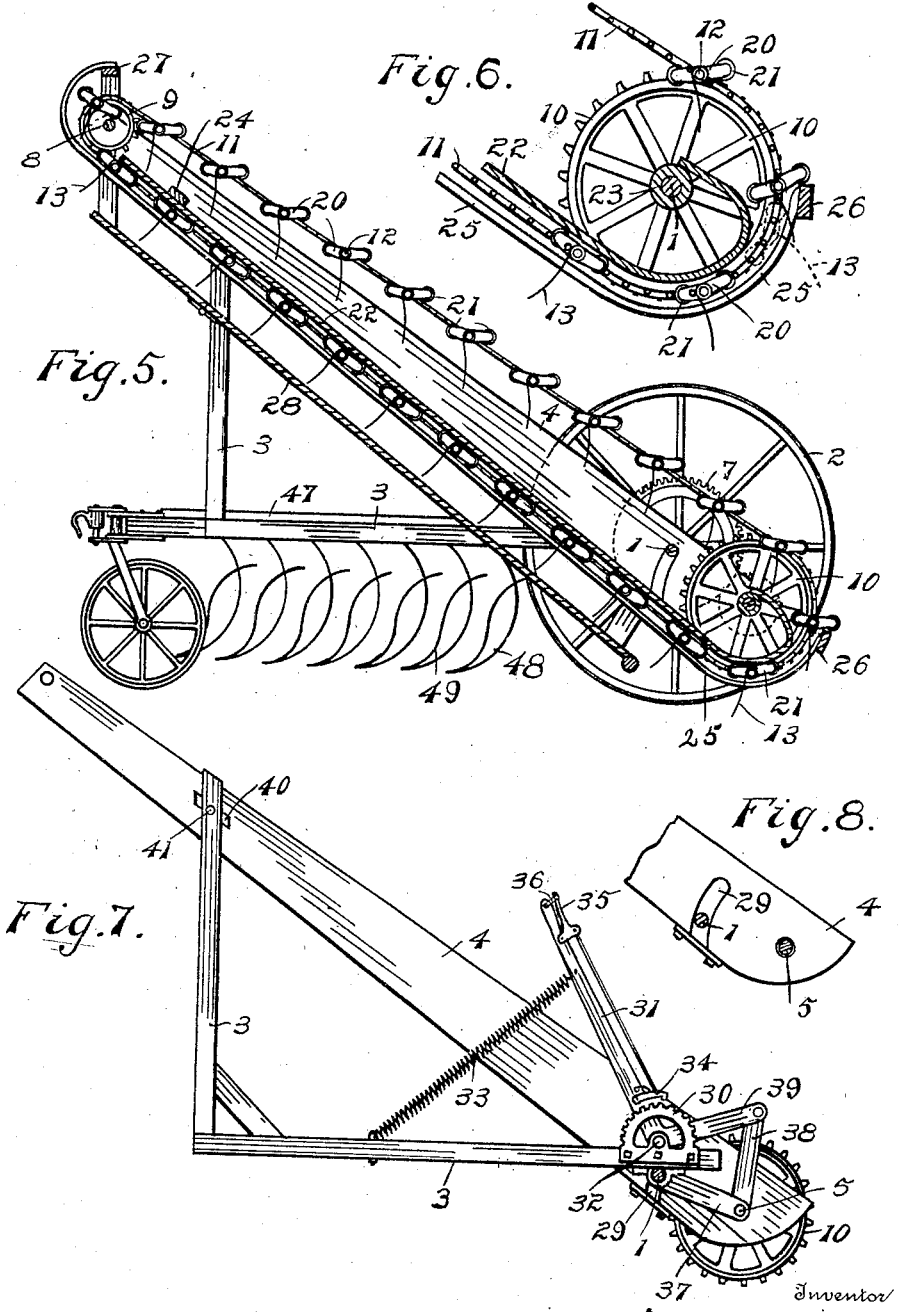

3 SHEETS—SHEET 3.

Witnesses
H. H. Hunt,
R. W. E. Mitchell

Inventor
John N. Davison,
By Walter N. Haskell,
Attorney

THE NORRIS PETERS CO., WASHINGTON, D. C.

UNITED STATES PATENT OFFICE.

JOHN N. DAVISON, OF FRANKLIN GROVE, ILLINOIS.

HAY RAKE AND LOADER.

No. 833,309.

Specification of Letters Patent.

Patented Oct. 16, 1906.

Application filed May 13, 1905. Serial No. 260,225.

*To all whom it may concern:*

Be it known that I, JOHN N. DAVISON, a citizen of the United States, residing at Franklin Grove, in the county of Lee and State of Illinois, have invented certain new and useful Improvements in Hay Rakes and Loaders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has reference to hay rakes and loaders, and covers certain novel means for gathering the hay from the ground and delivering it to the wagon, and, further, mechanism for drawing the hay for some distance at each side of the machine toward the center thereof, so that it may be operated upon by the loader mechanism.

Figure 9:
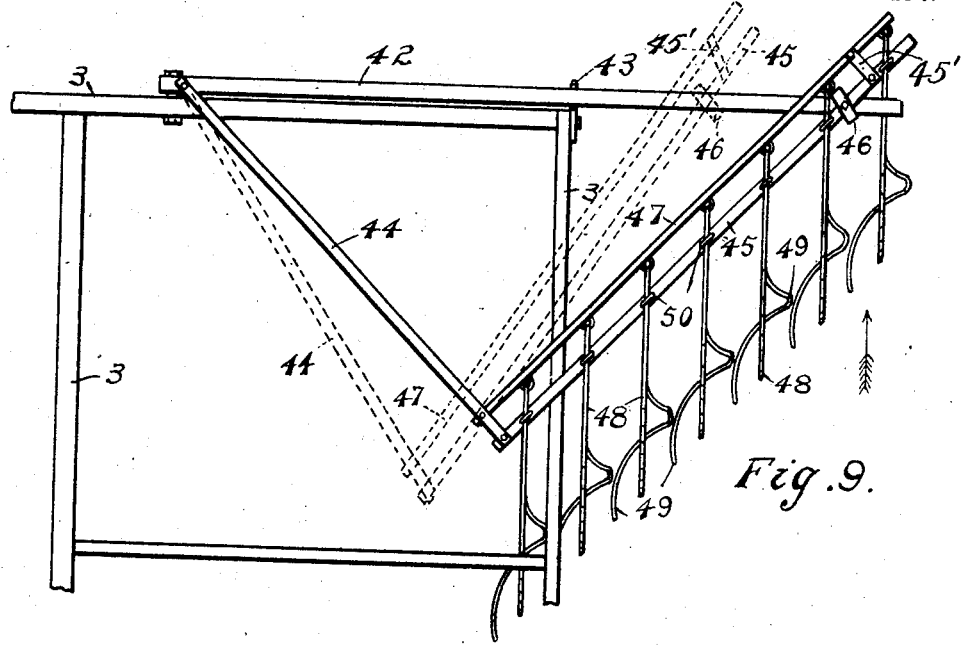
Figure 10:
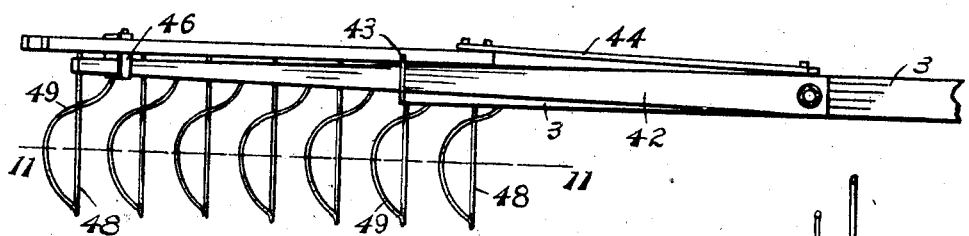
Figure 11:
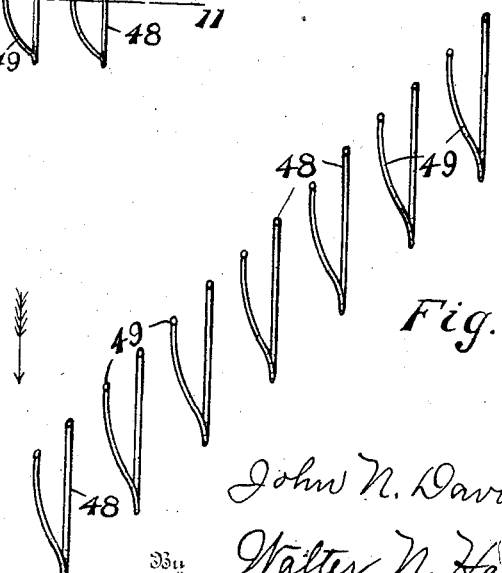

In the drawings, Figure 1 is a plan view of my device. Figs. 2 and 3 illustrate, in enlarged detail, some of the links of the elevator-chains. Fig. 4 is an enlarged detail showing a pair of the elevator-teeth in plan view. Fig. 5 is a longitudinal section in the line 5 5 of Fig. 1. Fig. 6 is an enlarged detail of the lower end of the elevator mechanism in section, as in Fig. 5. Fig. 7 is a side elevation illustrating the method of supporting the elevator mechanism on the carrying-wheels. Fig. 8 is a side elevation of the lower end of one of the elevator sides in detail. Fig. 9 is a plan view of one of the side rake-gangs. Fig. 10 is an elevation thereof from the front. Fig. 11 is a horizontal section in the line 11 11 of Fig. 10, showing the lower ends of the rake-teeth.

Similar numbers refer to similar parts throughout the several figures.

1 represents the main shaft of the machine supported on carrying-wheels 2 in the manner hereinafter described. Parts of the frame are indicated by 3, and 4 4 are the side pieces of the elevator, in the lower ends of which is journaled a rotary shaft 5, provided on its ends with pinions 6, actuated by gear-rims 7, fixed on the inner faces of the wheels 2. In the upper ends of the sides 4 is journaled a rotary shaft 8, upon which are fixed three sprocket-wheels 9, connected with a similar number of sprocket-wheels 10 on the shaft 5 by means of sprocket-chains 11.

Between each contiguous pair of the chains 11 is supported a series of uniformly-spaced tooth-bars 12 of gas-pipe construction, the ends of such bars being connected to the chains 11, as will be presently set forth. Each of the bars 12 is provided with a plurality of spring-teeth 13, arranged in pairs, each pair being united by a loop 14, held by a clip 15, which is adjustably secured to the tooth-bar.

In Fig. 2 is shown a special link 16, with which the outer chains 11 are provided at regular intervals, such links being provided with inwardly-projecting studs 17, upon which the outer ends of the bars 12 are pivoted. In alinement with the links 16, transversely of the machine, are links 18 in the central chain 11, having lateral studs 19, upon which the inner ends of the tooth-bars are supported. By this means the bars 12 are permitted to rotate freely upon their pivotal supports. The teeth on each bar are arranged in alinement thereon and naturally hang in vertical position below such bar.

Each of the bars 12 has fixed thereon a double arm 20, slightly concave on its upper face and provided at each end with rollers 21. The arms 20 of each series of tooth-bars are in line longitudinally of the machine. In line with each series of arms 20 on the lower side of the elevator is a track 22, fixed at the lower end to a boxing 23 on the shaft 1, and at the upper end to a cross-piece 24, secured to the sides 4 of the elevator, Figs. 5 and 6. As the bars 12 travel upwardly on the under side of the machine, the rollers 21 engage the lower face of the track 22, holding the tooth-bars in such position that the teeth 13 are approximately at a right angle to such track.

Alternating with the teeth 13 are slats 25, fixed at their lower ends to a cross-piece 26, secured to the sides 4, and at their upper ends to a cross-piece 27, mounted at the upper end of the elevator. The slats 25 are so disposed that two of them are directly beneath the rows of arms 20 as they pass upwardly on the lower side of the elevator and form tracks on the lower side of said arms. Supported beneath the elevator is the usual floor 28, upon which the hay is moved upwardly to the wagon.

In Figs. 7 and 8 are illustrated certain devices by the employment of which the elevator is supported on the carrying-wheels in such a way as to permit the adjustment of the lower end of the elevator with reference to the ground or to permit vertical play of such lower end with reference to the main shaft, as desired. The lower end of the side 4 is provided with a segmental slot 29, through which extends the shaft 1, such shaft being journaled on the lower side of the frame 3 on the outside of the piece 4. Fixed on the frame 3 is a rack 30, and a lever 31 is fulcrumed centrally of such rack upon a short shaft 32. 33 is a contractile coiled spring connecting the upper part of the lever 31 with the frame 3. Secured on the lever 31, just above the rack, is a dog 34, adapted to engage the teeth of said rack and hold the lever in a desired position. The dog 34 can be released from engagement with the rack by means of a handle 35, connected therewith and hinged near the top of the lever 31. The dog can be permanently held out of engagement with the rack by means of a link 36, pivoted in the end of the lever 31 and slipped over the handle 35, holding the dog in an elevated position. An arm 37 is loosely supported on the shaft 5 at its rear end and loosely engages the shaft 1, maintaining the relative positions of such shafts and preventing friction of the shaft 1 upon the sides of the slot 29 in its movements therein. Extending upwardly from the shaft 5 and loosely supported thereon is a bar 38, pivotally connected with an arm 39, fixed on the shaft 32.

As the lever 31 is moved forward the arm 39 is raised, drawing the shaft 5 upwardly until the shaft 1 is at or near the bottom of the slot 29 and the elevator at the highest point from the ground. The tension of the spring 33 should be sufficient to hold the lever in this position with the dog 34 out of engagement with the rack 30, whereupon when the machine is in motion the elevator will be permitted a limited amount of vertical oscillation or play. If it is desired to lower the rear end of the elevator, so as to bring the teeth 13 nearer the ground, the lever 31 is moved rearwardly, lowering the shaft 5 and elevator supported thereon. By means of the rack 30 and dog 34 the lever can be locked in the new position. To permit of the free movement of the side 4, it is provided with a slot 40 at its junction with the frame 3, such frame having a pin 41 engaging such slot.

Each side of the machine is provided with a device similar to that just described for the support of the elevator, only one thereof being shown in the drawings. The use of this means for supporting the elevator is optional and is not essential to the successful operation of the machine. It possesses the advantages hereinbefore referred to, however, over other machines wherein the elevator is more rigidly seated on the shaft.

In the movement of the machine the teeth 13 engage the hay at the lower end of the elevator, carrying it upwardly onto and along the floor 28 from the upper end of which it is delivered to the load. As the arms 20 pass beyond the upper ends of the tracks 22 the bars 12 are permitted to rock, the teeth assume a perpendicular position and draw upwardly out of the hay. The hay is prevented from following the teeth by the curved upper ends of the slats 25. In returning on the upper side of the elevator the arms 20 are in a horizontal position until the rear ends thereof come in contact with the cross-piece 26, throwing the teeth 13 outwardly and the front ends of the arms 20 into engagement with the tracks 22, as shown in Fig. 6. In the upward movement of the arms 20 the tracks 22 are engaged by the rollers 21 only, so that there is no friction between such parts. The hay is prevented from interfering with the operation of the tooth-bars and appurtenant mechanism by the slats 25.

Projected outwardly on each side of the machine is a series of auxiliary rake-teeth, one of said series being more fully shown in Figs. 9 to 11. Pivotally attached to the front of the frame 3 is a bar 42, capable of a slight amount of vertical play in a bracket 43, also fixed to the frame 3. A brace 44 is pivoted near the inner end of the bar 42, the rear end of such brace being pivotally connected with a bar 45, the outer end of which is attached to the outer end of the bar 42 by a clip 46. Parallel with the bar 45 is a bar 47, pivotally connected with the brace 44 at its inner end and at its outer end being loosely connected to the bar 45 by means of link 45' and pivots. Supported by the bars 45 and 47 is a series of curved teeth 48, provided with rearwardly-bent portions 49, the upper parts of the teeth passing through small arches 50 on the bar 45 and having their front ends pivotally secured to the bar 47. The bent portions 49 of the teeth first curve rearwardly, then outwardly and upwardly, again curving inwardly across the teeth and in front thereof. The bent portions extend outwardly about half the distance from the teeth on which they are fixed to the next adjacent tooth and are so formed that their central portions are in alinement with the lower portions of the teeth obliquely of the line of movement of the machine, as will be seen in Figs. 10 and 11.

In the progress of the machine the teeth 48 gather the hay for some distance at each side of the machine, the hay moving inwardly toward the center of the machine, where it is engaged by the elevator-teeth. In its inward movement the hay is alternately acted upon by a bent member 49 and tooth 48, the operation being quite similar to that of the moldboard of a plow. If the hay is heavy and it is desired to gather a less amount at the sides of the machine, this can be readily accomplished by releasing the outer end of the bar 45, moving it inwardly along the bar 42, and again securing it thereto in the new position, as shown in dotted lines in Fig. 9. This will bring an additional tooth or two within the frame 3 and will necessitate swinging the bar 42 upwardly to permit the teeth to clear such frame. By reason of the arrangement of the bars 45 and 47 and brace 44 in lazy-tong style the position of the teeth 48 in line with the movement of the machine is not disturbed by any change in the position of the bars. Such teeth retain their former position parallel with each other and with the side piece 3 of the frame, being merely drawn closer to one another or correspondingly separated by the changed positions of the supporting-bars.

In operation the teeth slide over the surface of the ground, the vertical play of the bar 42 permitting them to pass readily over any inequalities therein.

What I claim as my invention, and desire to secure by Letters Patent of the United States, is—

1. The combination, with the shaft 1 and wheels 2 thereon, of the elevator sides 4, provided with slots 29; the shaft 5, journaled in the sides 4; and means for supporting the shaft 5 from the shaft 1, so as to permit a flexible vertical movement of the elevator mechanism thereon, substantially as shown and set forth.

2. The combination, with the shaft 1, and wheels 2 thereon, of the elevator sides 4, provided with slots 29, engaged by the shaft 1; the shaft 5, journaled in the sides 4; means for supporting the shaft 5 from the shaft 1, so as to permit vertical adjustment of the shaft 5; and means for locking the shaft 5 in its adjusted position, substantially as shown and for the purpose named.

3. The combination, with the shaft 1, and wheels 2 thereon, of the frame 3, supported at its rear end on the shaft 1; the side 4, flexibly attached to the forward part of the frame 3; the shaft 5, journaled in the side piece 4 at its rear end; the arm 39, pivoted on the frame 3, above the shaft 1; the bar 38, connecting the arm 39 and shaft 5; means for suitably raising and lowering the arm 39; and means for locking said arm in any desired position, substantially as shown and for the purpose set forth.

4. The combination, with the shaft 1, and wheels 2 thereon, of the frame 3, supported at its rear end on the shaft 1; the side 4, flexibly attached to the forward part of the frame 3; the shaft 5, journaled in the rear end of the side 4; the arm 39, pivoted on the frame 3 above the shaft 1; the bar 38, connecting the arm 39 and shaft 5; the arm 37, loosely connecting the shafts 1 and 5; means for suitably raising and lowering the arm 39, and means for locking the arm 39 in any desired position, substantially as set forth.

5. In a machine of the type set forth, the combination with the frame, of a bar pivoted to the frame, a pair of bars pivoted together at one end, one bar of the pair being pivoted to the first-named bar, the other bar of the pair being slidably connected to the said first-named bar, a bar parallel with one of the bars of the pair and being pivotally connected to the other bar of the pair, and rake-teeth pivotally mounted on the parallel bars.

6. In a machine of the type set forth, the combination with the frame thereof, of a horizontal bar pivoted at one end to the frame, a second bar pivoted at one end to the first-named bar, a rake pivoted to the outer end of the second bar and slidably connected to the outer end of the first bar.

7. In a machine of the type set forth, the combination with the frame, of a bar extending transversely of the frame, a link pivoted at its inner end to the inner end of said bar, a rake pivoted at its one end to the outer end of the link and its opposite end being slidably connected to the outer end of the said bar, a bar pivoted to said link and parallel to said rake and connected thereto by a link at its outer end, said last-named bar and links keeping the teeth of the rake at all times in line with the line of travel of the machine.

8. In machine of the type set forth, the combination with the frame, of a horizontal support pivoted at a single point to the frame and capable of vertical movement, a horizontal rake carried by said support and bearing an angular relation to the line of travel of the machine, means for varying such angular relation, and means for automatically keeping the teeth of the rake at all times in line with the line of travel of the machine.

In testimony whereof I affix my signature in presence of two witnesses.

JOHN N. DAVISON.

Witnesses:
R. W. E. MITCHELL,
C. H. WOODBURN.